United States Patent
Sanicki et al.

(10) Patent No.: US 7,296,656 B2
(45) Date of Patent: Nov. 20, 2007

(54) ACOUSTIC MECHANICAL RETAINER

(75) Inventors: Scott Sanicki, East Hampton, CT (US); Mark W. Costa, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 357 days.

(21) Appl. No.: 11/112,946

(22) Filed: Apr. 22, 2005

(65) Prior Publication Data

US 2006/0237261 A1    Oct. 26, 2006

(51) Int. Cl.
- B64C 1/40 (2006.01)
- B64C 1/12 (2006.01)
- B64C 1/06 (2006.01)
- B64D 33/02 (2006.01)
- F02K 1/82 (2006.01)

(52) U.S. Cl. ............... 181/210; 181/214; 244/1 N; 244/131; 244/132

(58) Field of Classification Search ............. 181/210, 181/214, 213, 292; 244/1 N, 53 B, 131, 244/132
See application file for complete search history.

(56) References Cited

U.S. PATENT DOCUMENTS

| | | | | |
|---|---|---|---|---|
| 3,821,999 | A * | 7/1974 | Guess et al. | 181/296 |
| 4,161,231 | A * | 7/1979 | Wilkinson | 181/292 |
| 4,293,053 | A * | 10/1981 | Shuttleworth et al. | 181/213 |
| 5,000,399 | A * | 3/1991 | Readnour et al. | 244/53 B |
| 5,297,760 | A * | 3/1994 | Hart-Smith | 244/132 |
| 5,581,054 | A * | 12/1996 | Anderson et al. | 181/213 |
| 6,328,261 | B1 * | 12/2001 | Wollaston et al. | 244/132 |
| 6,761,245 | B2 * | 7/2004 | Porte | 181/210 |
| 6,772,857 | B2 * | 8/2004 | Porte et al. | 181/210 |
| 6,820,337 | B2 * | 11/2004 | Buge et al. | 29/897.32 |
| 6,892,526 | B2 * | 5/2005 | Stretton et al. | 60/226.1 |
| 6,923,931 | B2 * | 8/2005 | Dublineau et al. | 264/414 |
| 2002/0078569 | A1 * | 6/2002 | Buge et al. | 156/308.4 |
| 2004/0045766 | A1 | 3/2004 | Porte et al. | |
| 2005/0081992 | A1 | 4/2005 | Buge et al. | |

FOREIGN PATENT DOCUMENTS

| | | |
|---|---|---|
| EP | 0 572 725 | 12/1993 |
| EP | 1 167 185 | 1/2002 |
| EP | 1 621 752 | 2/2006 |
| EP | 1 715 158 | 10/2006 |

OTHER PUBLICATIONS

Extended European Search Report dated Dec. 28, 2006.

* cited by examiner

*Primary Examiner*—Edgardo San Martin
(74) *Attorney, Agent, or Firm*—Carlson, Gaskey & Olds

(57) ABSTRACT

A fan case assembly includes a noise attenuation layer that is covered by a face sheet. The face sheet includes a first plurality of openings. The noise attenuation layer includes a plurality of individual cells that are in communication with at least one of the first plurality of openings. Noise energy is communicated through the first plurality of openings into the individual cells and dissipated to reduce noise emissions. A seam in the face sheet is covered to protect the underlying noise attenuation layer from damage by a retainer. The retainer is bonded to the face sheet over the seam and includes a second plurality of holes that communicates noise energy through the retainer to the noise attenuation layer. Communication of noise energy through the retainer provides an acoustically active seam that aids in the dissipation of noise energy and thereby reduces the level of sound emitted from the engine.

22 Claims, 4 Drawing Sheets

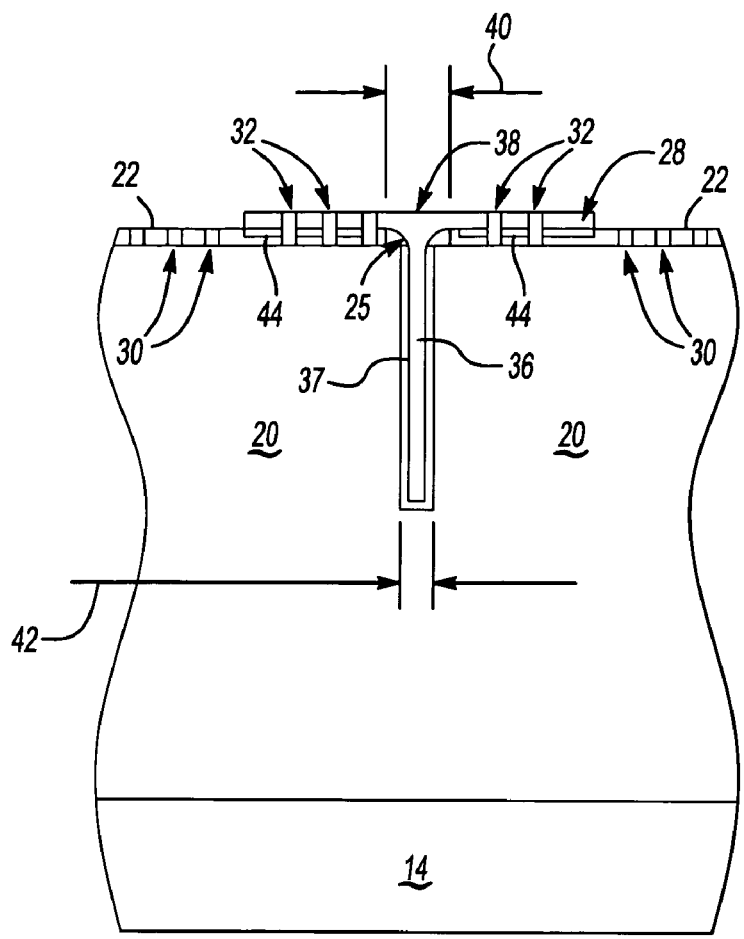
_Fig-3_
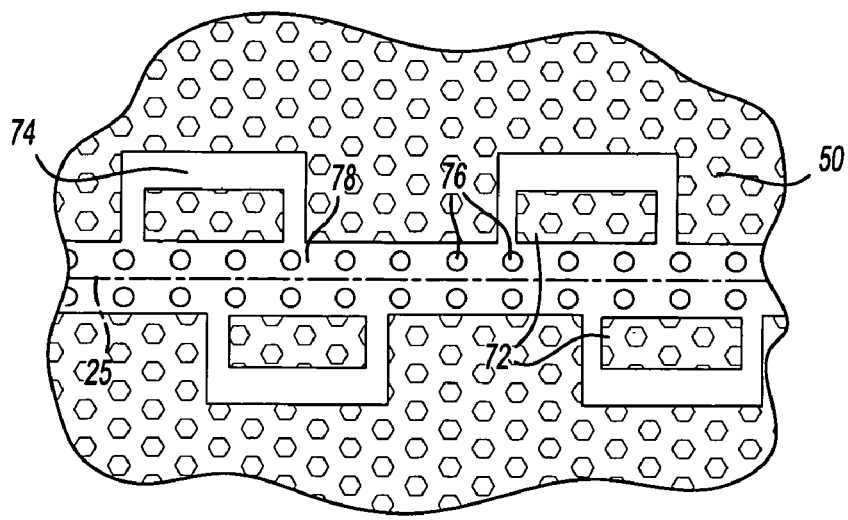
_Fig-8_

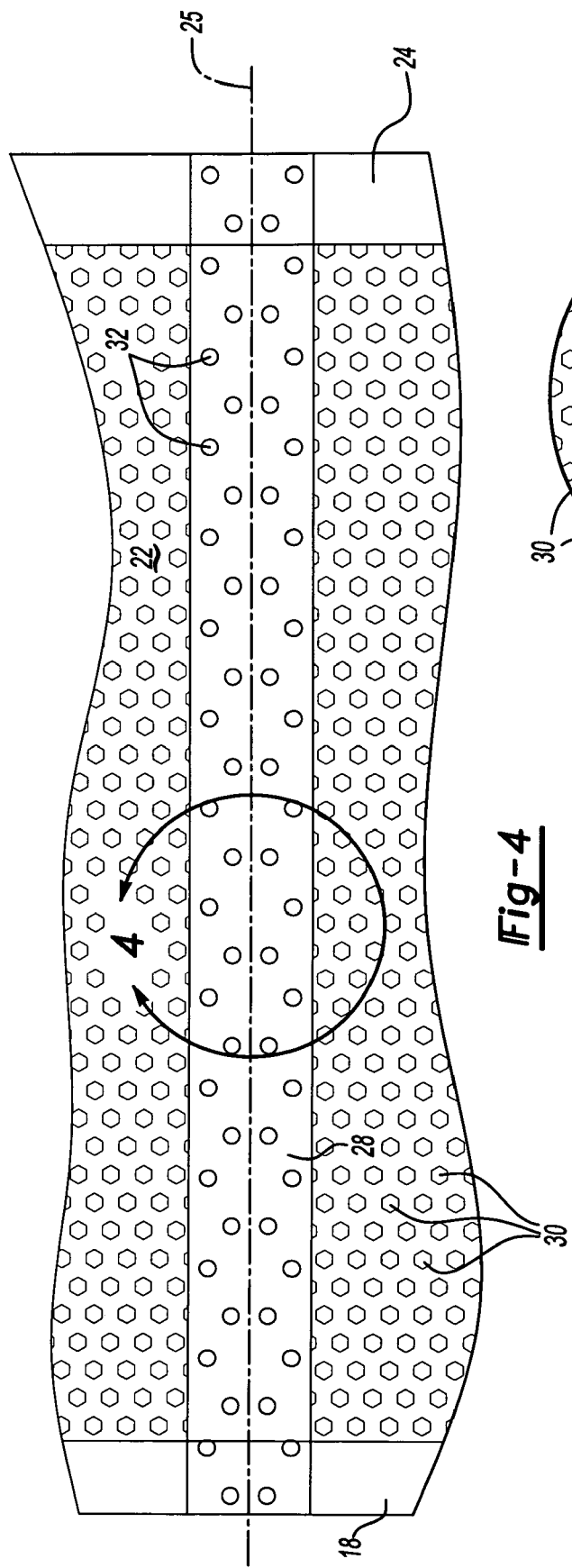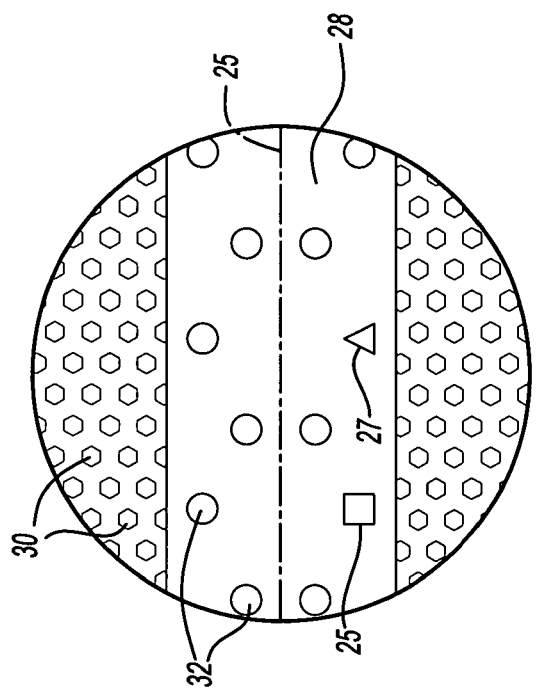
Fig-4
Fig-5

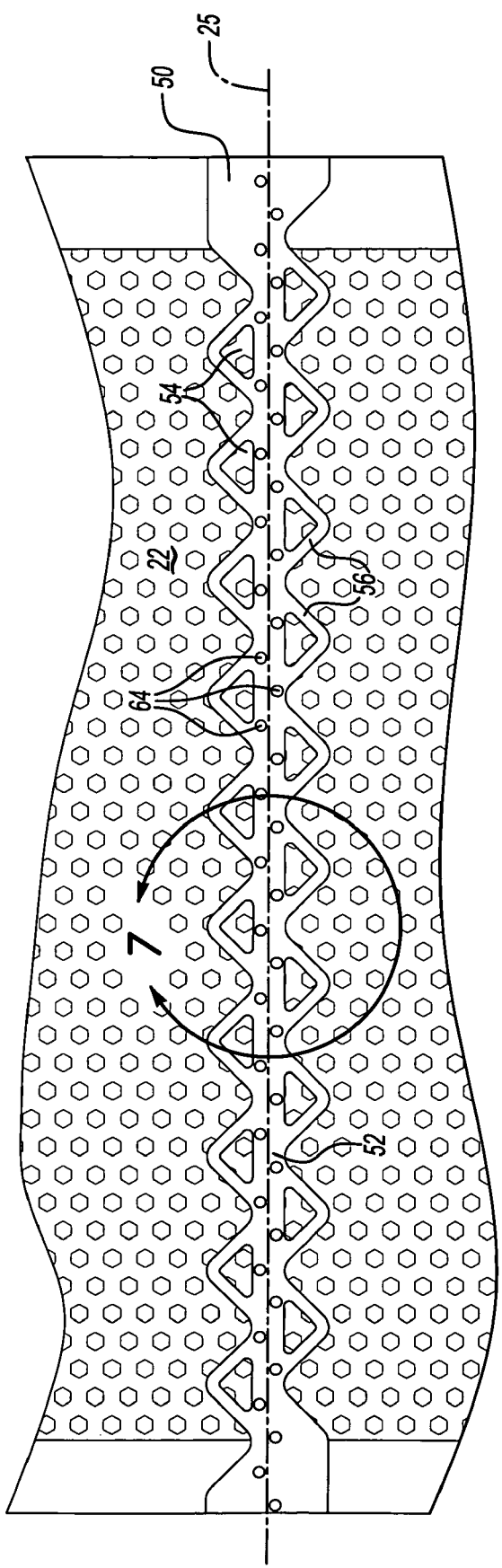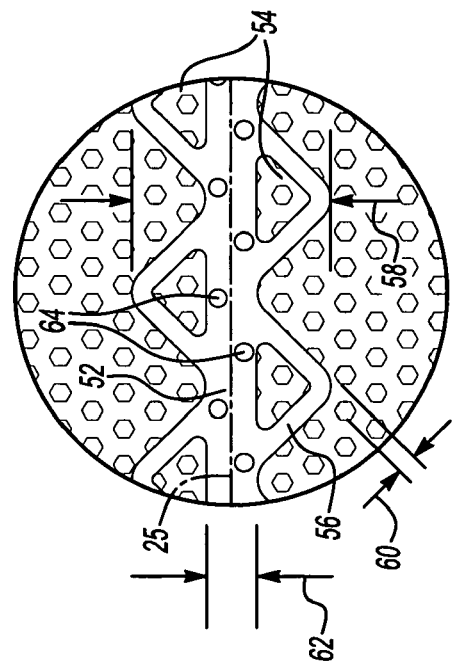

ACOUSTIC MECHANICAL RETAINER

BACKGROUND OF THE INVENTION

This invention generally relates to a liner assembly for a duct, and more particularly to a liner assembly including an acoustically active retainer.

Conventional turbine and turbofan engines for aircraft include a plurality of fan blades that rotate within a duct commonly known as a fan case. The fan case serves as a protective covering to protect the fan blades and the aircraft. Further the fan case channels airflow into the turbine engine. The inner surface of the fan case is constructed to withstand impacts from objects that may come into contact with the fan case and includes acoustical features to reduce noise emitted from the engine.

The acoustical features include a layer of noise attenuation structures covered by a protective face layer including a plurality of openings. The face layer is typically a thin sheet of metal or composite material mounted over the noise attenuation structure. Noise causing pressure disturbances emanate through the openings within the face layer into the noise attenuation structure where the pressure disturbances dissipate to reduce the total amount of noise.

The fan case liner includes seams between the several pieces of material used to form the protective face layer. These seams typically are required to accommodate assembly of the noise attenuation structure and face layer. The seam is covered with a mechanical retainer that is bonded to the face layer on either side of the seam. The mechanical retainer covers any underlying openings within the face layer creating an acoustically dead area relative to the rest of the liner assembly. The acoustically dead area reduces the effectiveness of the noise attenuation layer, increasing the total amount of emitted noise.

Accordingly, it is desirable to develop a mechanical joint for covering seams in a liner assembly that is acoustically active to improve noise attenuation properties.

SUMMARY OF THE INVENTION

An example liner assembly according to this invention includes an acoustically active retainer for covering a seam in a face sheet for improving noise attenuation performance.

The example liner assembly includes a noise attenuation layer that is covered by a face sheet. The face sheet includes a first plurality of openings. The noise attenuation layer includes a plurality of individual cells that are each in communication with at least one of the first plurality of openings. Noise energy is communicated through the first plurality of openings into the individual cells and dissipated to reduce noise emissions.

The face sheet is formed from one or several individual sheets with edges adjacent each other that form a seam. The seam results from assembly tolerance stack-ups and also provides for limited expansion and contraction during operation. The seam is covered by a retainer to protect the edges of the face sheet and the underlying noise attenuation layer from damage. The retainer is bonded to the face sheet over the seam and includes a second plurality of holes that communicates noise energy through the retainer to the noise attenuation layer. Communication of noise energy through the retainer provides an acoustically active seam that aids in the dissipation of noise energy and thereby reduces the level of sound emitted from the duct.

Accordingly, the example retainer of this invention provides an acoustically active mechanical retainer that includes a plurality of openings to communicate noise energy to a noise attenuation layer that improves noise attenuation properties of the liner assembly.

These and other features of the present invention can be best understood from the following specification and drawings, the following of which is a brief description.

BRIEF DESCRIPTION OF THE DRAWINGS

FIG. 3 is a cross-sectional view of an example retainer according to this invention.

FIG. 4 is a plan view of an example retainer according to this invention.

FIG. 5 is an enlarged view of the example retainer shown in FIG. 4.

FIG. 6 is a plan view of another example retainer according to this invention.

FIG. 7 is an enlarged view of the example retainer of FIG. 6.

FIG. 8 is plane view of another retainer according to this invention.

DETAILED DESCRIPTION OF THE PREFERRED EMBODIMENT

Figure 1:
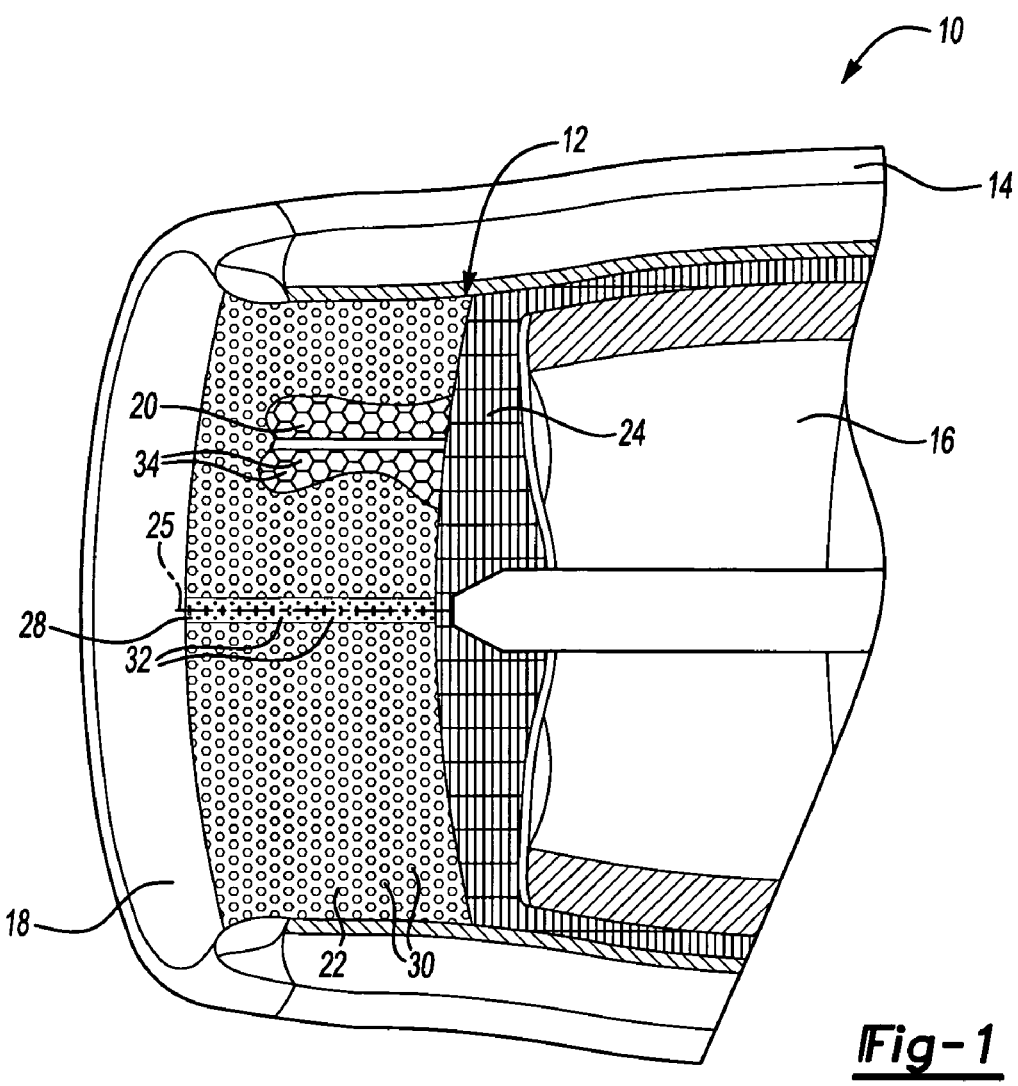
FIG. 1 is a sectional view of a fan case and liner assembly.
Figure 2:
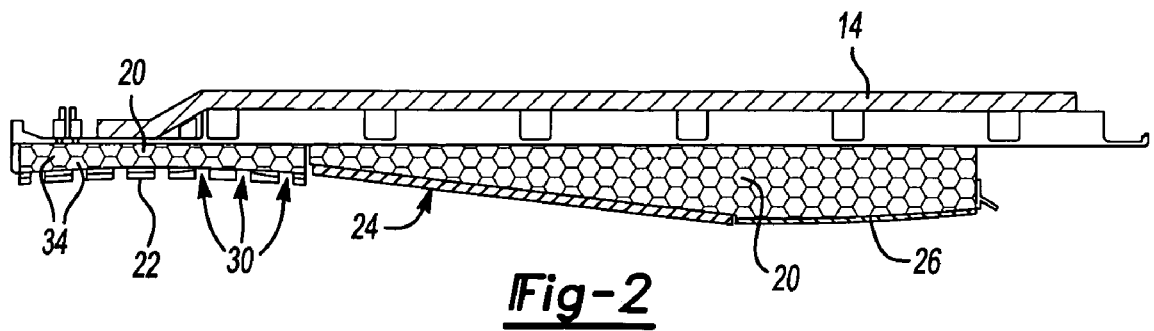
FIG. 2 is a cross-section of a wall of the fan case assembly.

Referring to FIGS. 1 and 2, a duct commonly known as a fan case assembly 10 for a turbine engine includes a liner assembly 12 mounted within a housing 14. A cowling 18 defines a leading edge of the fan case assembly 10 and is flush with an interior surface of the liner assembly 12. The liner assembly 12 includes a noise attenuation layer 20 that is covered by a face sheet 22. Rearward of the face sheet 22, the noise attenuation layer 20 is covered by an abradable strip 24 that is adjacent a fan blade 16. The abradable strip 24 includes a structure and material that can endure limited contact with the fan blade 16 to protect both the fan blade 16 and the fan case assembly 10. Rearward of the abradable strip 24 is a plate 26. The plate 26 protects the fan case assembly 10 against possible impacts from debris. Although this invention is described and shown by example as a fan case liner, any duct including noise attenuation features would benefit from this disclosure and is within the contemplation of this invention.

The face sheet 22 includes a first plurality of openings 30. The noise attenuation layer 20 includes a plurality of individual cells 34 that are in communication with at least one of the first plurality of openings 30. Noise energy is communicated through the first plurality of openings 30 into the individual cells 34 and dissipated to reduce noise emissions. The face sheet 22 is formed from one or several individual sheets placed adjacent each other forming a seam 25. The seam 25 results from assembly tolerance stack-ups and also provides for limited expansion and contraction during operation. The seam 25 is covered to protect the underlying noise attenuation layer 20 from damage by a retainer 28.

The retainer 28 is bonded to the face sheet 22 over the seam 25. The retainer 28 necessarily covers the first plurality of openings 30 adjacent the seams 25, potentially creating an acoustically dead zone where noise energy is reflected instead of being communicated to the noise attenuation layer 20. However, the retainer 28 of this invention includes a second plurality of openings 32 that communicates noise energy through the retainer 28 to the noise attenuation layer 20. Communication of noise energy through the retainer 28 provides an acoustically active seam 25 that aids in the dissipation of noise energy and thereby reduces the level of sound emitted from the liner assembly 12.

Referring to FIG. 3, the retainer 28 is shown in cross-section and is T-shaped including a tail section 36 that extends into the seam 25 from a center portion 38. The tail section 36 extends into a slot 37 formed within the noise attenuation structure 20. The slot 37 is formed to accommodate the tail section 36 and is not part of a seam within the noise attenuation structure 20. Seams within the noise attenuation structure are staggered such that they do not align with the seam 25 of adjacent face sheets 22.

The retainer 28 is bonded to the face sheet 22 by an adhesive 44 on either side of the seam 25. The adhesive 44 cures and results in blockage of some of the first plurality of openings 30 in the face sheet 22. The second plurality of openings 32 are then formed through the retainer 28, the face sheet 22 and the adhesive 44 to provide communication of noise energy to the noise attenuation layer 20.

The seam 25 includes a width 42 and the center portion 38 is of a width 40 that is greater than the width 42 to assure coverage of the seam 25. The width 42 of the seam 25 will vary over several liner assemblies, and therefore the width 40 of the center portion 38 is determined to provide coverage of any seam width 42 possible given acceptable tolerances are maintained during assembly.

Referring to FIGS. 4 and 5, the retainer 28 is shown along the axially extending seam 25. Although the seam 25 is shown extending axially, other seam configurations and orientations would also benefit from application of this invention. The retainer 28 extends along and covers the entire seam 25 from the cowling 18 to the abradable strip 24. The second plurality of openings 32 within the retainer 28 are arranged in a substantially repeating geometric pattern. Fabricating the openings 32 to communicate with individual cells 34 of the noise attenuation layer 20 provides for a more efficient dissipation of noise energy.

The second plurality of openings 32 are larger in diameter than the first plurality of openings. This allows less of the second plurality of openings 32 to provide the same cumulative opening area as a greater number of openings that are the size of the first plurality of openings 30. Further, the shape of the second plurality of openings 32 are shown as circular. However, other shapes such as a square opening 25 and a triangular opening 27 are within the contemplation of this invention. Other shapes of openings, other than those shown in FIG. 5 are also within the contemplation of this invention.

Referring to FIGS. 6 and 7, another example retainer 50 is shown and includes a plurality of acoustic regions 54 extending from either side of a center portion 52. A second plurality of openings 64 are disposed within the center portion 52 to communicate noise energy to the noise attenuation layer 20 below. The acoustic regions 54 are triangular openings through the retainer 50 for exposing the first plurality of openings 30 within the face sheet 22 to noise energy. The acoustic regions 54 are defined by a web structure 56 that extends from either side of the center portion 52. The web structure 56 is a geometric repeating chevron shaped pattern within which the triangular acoustic regions 54 are disposed.

The web structure 56 extends outwardly from the center portion 52 to provide an overall width 58 of the retainer 50. The overall width 58 includes the center width 62. The center width 62 is based on possible seam width 40 dimensions such that the center portion 52 will in all cases cover the seam 25. The width 58 provides a desired bonding area to assure positive adherence to the face sheet 22. The width 58 of the retainer 50 can vary with the application to provide sufficient area on either side of the seam 25 to assure that the adhesive 44 can secure the retainer 50 in place.

The web structure 56 includes a width 60. The width 60 is of such a size as to provide minimal blockage of the first plurality of openings 30. Further, the width 60 is of a size that is less than or equal to a spacing between the first plurality of openings 30 within the face sheet 22. Such sizing minimizes the amount openings 30 that are covered by the retainer 50.

The retainer 50 includes a repeating triangular or chevron patterned web structure 56. However, other patterns of web structure are within the contemplation of this invention. Referring to FIG. 8, another example retainer 70 is shown that includes a plurality of rectangular acoustic regions 72 disposed on either side of a center portion 78. A web structure 74 extends outward from the center portion 78 to define the repeating array of acoustic regions 72. A second plurality of openings 76 are formed in the center portion 78 to provide the desired communication of noise energy to the underlying noise attenuation layer 20.

Accordingly, the example retainer of this invention includes a plurality of openings through to a noise attenuation layer to provide uninterrupted acoustic performance within a fan case assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A liner assembly for a duct comprising:
   a noise attenuation layer;
   a face sheet covering said noise attenuation layer including a first plurality of openings and a seam; and
   a retainer covering said seam including a second plurality of openings for communicating sound energy through said retainer and said face sheet to said noise attenuation layer, wherein said second plurality of openings extend through said retainer and a portion of said face sheet underlying said retainer.

2. A liner assembly for a duct comprising:
   a noise attenuation layer;
   a face sheet covering said noise attenuation layer including a first plurality of openings and a seam; and
   a retainer covering said seam including a second plurality of openings for communicating sound energy through said retainer to said noise attenuation layer,
   wherein said retainer includes a tail portion extending into said seam.

3. The assembly as recited in claim 1, wherein said retainer includes a center portion, wherein said second plurality of openings are disposed within said center portions.

4. The assembly as recited in claim 1, wherein said retainer includes a plurality of acoustic regions open to said face sheet.

5. The assembly as recited in claim 4, including a plurality of acoustic regions disposed on opposite sides of said center portions.

6. The assembly as recited in claim 4, including a web structure extending from said center portion, said web structure defining said acoustic regions.

7. The assembly as recited in claim 6, wherein said web structure includes a width that is less than or equal to a spacing between said first plurality of openings.

8. The assembly as recited in claim 4, wherein said acoustic regions are triangular.

9. The assembly as recited in claim 4, wherein said acoustic regions are rectangular.

10. The assembly as recited in claim 1, including an adhesive for bonding said retainer to said face sheet.

11. A retainer for a liner assembly having a noise attenuation layer and a face sheet covering the noise attenuation layer including a first plurality of openings, said retainer comprising:

a center portion covering a seam between adjacent edges of the face sheet including a second plurality of openings for communicating sound energy through said retainer to the noise attenuation layer, and a tail extending into a seam in the face sheet.

12. The assembly as recited in claim 11, wherein said second plurality of openings are disposed within said center portion.

13. The assembly as recited in claim 11, wherein said retainer includes a plurality of acoustic regions open to said face sheet.

14. The assembly as recited in claim 13, including a plurality of acoustic regions disposed on opposite sides of said center portions.

15. The assembly as recited in claim 14, including a web structure extending from said center portion, said web structure defining said acoustic regions.

16. The assembly as recited in claim 11, wherein said acoustic regions are triangular.

17. The assembly as recited in claim 11, wherein said acoustic regions are rectangular.

18. A method of fabricating a liner assembly, said method comprising the steps of:
   a. assembling a face sheet including a first plurality of openings over a noise attenuation structure, said face sheet including a seam formed by adjacent portions of the face sheet;
   b. covering the seam with a retainer;
   c. bonding the retainer to the face sheet with an adhesive; and
   d. forming a second plurality of openings through the retainer and the adhesive to communicate noise energy to said noise attenuation structure.

19. The method as recited in claim 18, wherein said second plurality of openings is larger than said first plurality of openings.

20. The method as recited in claim 18, wherein said step b) includes bonding said retainer to abutting portions of said face sheet bounding said seam.

21. The method as recited in claim 18, wherein said step d) includes forming the second plurality of openings through portions of said retainer covering the face sheet.

22. The method as recited in claim 18, including the step of forming in said retainer a plurality of acoustic regions open to said face sheet.

* * * * *

UNITED STATES PATENT AND TRADEMARK OFFICE
CERTIFICATE OF CORRECTION

PATENT NO. : 7,296,656 B2 Page 1 of 1
APPLICATION NO. : 11/112946
DATED : November 20, 2007
INVENTOR(S) : Sanicki et al.

It is certified that error appears in the above-identified patent and that said Letters Patent is hereby corrected as shown below:

Claim 3, Column 4, line 56-57: "portions" should read as --portion--

Signed and Sealed this

Fifteenth Day of April, 2008

JON W. DUDAS
*Director of the United States Patent and Trademark Office*